United States Patent [19]

Weber

[11] Patent Number: 5,305,680
[45] Date of Patent: Apr. 26, 1994

[54] CONTROL DEVICE FOR HYDRAULIC ACTUATING CYLINDERS OF A LOADING TAILGATE OF A VEHICLE

[76] Inventor: Günter Weber, Hauptplatz 23, A-2474 Gattendorf, Austria

[21] Appl. No.: 867,672
[22] PCT Filed: Jan. 9, 1991
[86] PCT No.: PCT/AT91/00005
 § 371 Date: Jun. 30, 1992
 § 102(e) Date: Jun. 30, 1992
[87] PCT Pub. No.: WO91/10577
 PCT Pub. Date: Jul. 25, 1991

[30] Foreign Application Priority Data
 Jan. 10, 1990 [AT] Austria ..................... 46/90

[51] Int. Cl.$^5$ .................. F01B 25/26; F16D 31/02
[52] U.S. Cl. .................. 91/1; 60/426;
 60/452; 91/517; 91/518; 417/34
[58] Field of Search ........ 60/420, 422, 423, 426,
 60/431, 432, 452; 91/1, DIG. 4, 511, 512, 514,
 515, 517, 518; 417/34

[56] References Cited

U.S. PATENT DOCUMENTS

| | | | |
|---|---|---|---|
| 2,848,122 | 8/1958 | Gwinn, Jr. | |
| 4,031,966 | 6/1977 | Farrell | 60/417 X |
| 4,036,106 | 7/1977 | Athy | 60/413 X |
| 4,439,063 | 3/1984 | Heitkamp | 91/518 X |
| 4,505,111 | 3/1985 | Okamoto et al. | 60/431 |
| 4,635,440 | 1/1987 | Kropp | 60/431 X |
| 4,665,696 | 5/1987 | Rosman | 60/417 X |
| 4,747,268 | 5/1988 | Reinhardt | 60/426 |
| 4,862,691 | 9/1989 | Peschel | 60/431 X |

FOREIGN PATENT DOCUMENTS

| | | |
|---|---|---|
| 7024806 | 3/1971 | Fed. Rep. of Germany . |
| 3724226 | 2/1989 | Fed. Rep. of Germany . |
| 1202673 | 8/1970 | United Kingdom . |

Primary Examiner—Richard A. Bertsch
Assistant Examiner—Hoang Nguyen
Attorney, Agent, or Firm—Frishauf, Holtz, Goodman & Woodward

[57] ABSTRACT

A control device for hydraulic operating cylinders of a tailgate of a vehicle to determine maximum pressures arising in the operation and, particularly, overloading of the tailgate, resulting in excessive pressures. A power-driven hydraulic pump (1) is connected to a reservoir (4) and, via branch lines (8', 8''), with associated gate control valves (10, 13) which include a closing cylinder (14) for the tailgate. A pressure intensifier piston-cylinder unit (15) is connected parallel to the branch pipes. An electric pressure-sensitive switch (16), which is also connected to a counter (17) and to an interrupter switch (18) for the electric pump motor, switches off the pump motor (2) when the predetermined pressure is exceeded. This switch is connected to the closing cylinder (14) for the tailgate. Connected to the switch (16) or hydraulically connected to the closing cylinder is a maximum pressure indicating pressure gauge or manometer (20), which is not accessible from the outside of the vehicle, and which indicates a maximum overload which was exerted on the tailgate.

7 Claims, 2 Drawing Sheets

CONTROL DEVICE FOR HYDRAULIC ACTUATING CYLINDERS OF A LOADING TAILGATE OF A VEHICLE

FIELD OF THE INVENTION

The invention relates to a control device for hydraulic actuating cylinders of a loading tailgate of a vehicle.

BACKGROUND

A known control device, see for example German U 70 24 806, comprises a motor-driven hydraulic medium pump which can be connected via associated control valves to a medium reservoir and via pump branch lines to a chamber of a lifting cylinder and a locking cylinder of the loading tailgate. A pressure intensifier piston cylinder is connected in parallel to the pump branch lines.

According to an earlier proposal, see U.S. application Ser. No. 07/838,406, filed Mar. 3, 1992, by the inventor hereof, now U.S. Pat. No. 5,255,517, to which Austrian Patent No. 392,447 corresponds, an electric manometric or pressure switch by means of which the pump motor drive can be stopped when a predetermined pressure is exceeded, or an adjustable hydraulic valve by means of which the pump branch lines can be blocked or the pump line can be connected to a return line to the medium reservoir and possibly the pump motor drive can be stopped, is connected to the chamber of the smaller head end of the pressure intensifier piston cylinder connected to the locking cylinder.

By virtue of this device, the pump motor is stopped and/or the hydraulic medium supply line is blocked or unloaded in a constructionally simple manner before overload of the closing cylinder of the loading tailgate can occur.

According to an advantageous embodiment as disclosed in the earlier proposal, a counter for the number of cases where the pressure is exceeded can be activated by the electric manometric or pressure switch or by the adjustable hydraulic valve.

THE INVENTION

The object of this invention is an improvement of the system of the prior application, now U.S. Pat. No. 5,255,517, by means of which not only the number of cases of loading leading to stoppage or interruption can be determined, but also the level of the maximum overload of the closing cylinder which can occur when the loading tailgate is unduly further loaded after stoppage of the pump motor or interruption of the hydraulic medium line, possibly then leading to breakdown of the closing cylinder.

Briefly, in a control device of the type described above, an electric manometric switch connected to a meter and an interrupter switch for the connection to the electric pump motor and by means of which the pump motor can be stopped when a predetermined pressure is exceeded, is connected to the closing cylinder, and a manometer or pressure gauge having a maximum indicator which is not accessible from the outside and indicates a possible maximum overload of the loading tailgate after stoppage of the pump motor being connected to this manometric switch.

The invention allows for accurate indication of an inadmissable overload of the loading tailgate without the possibility of intervention on the part of the operator.

An alternative control device according to the invention has the features that an adjustable hydraulic shuttle or shut-off valve by means of which the pump branch lines can be blocked or the pump line can be connected to a return line to the medium reservoir and possibly the pump motor can be stopped, is connected to the chamber of the smaller head end of the pressure intensifier piston cylinder connected to the closing cylinder; in accordance with a feature of the invention, a manometer having a maximum indicator which is not accessible from the outside, indicating a possible maximum overload of the loading tailgate after activation of the adjustable hydraulic valve, is connected to the closing cylinder.

DRAWINGS

Embodiments of the invention will now be described in more detail with reference to the accompanying drawings, in which:

FIG. 1 is a hydraulic circuit diagram of a control device according to the invention, and FIG. 2 is a hydraulic circuit diagram of an alternative embodiment.

DETAILED DESCRIPTION

Figure 1:
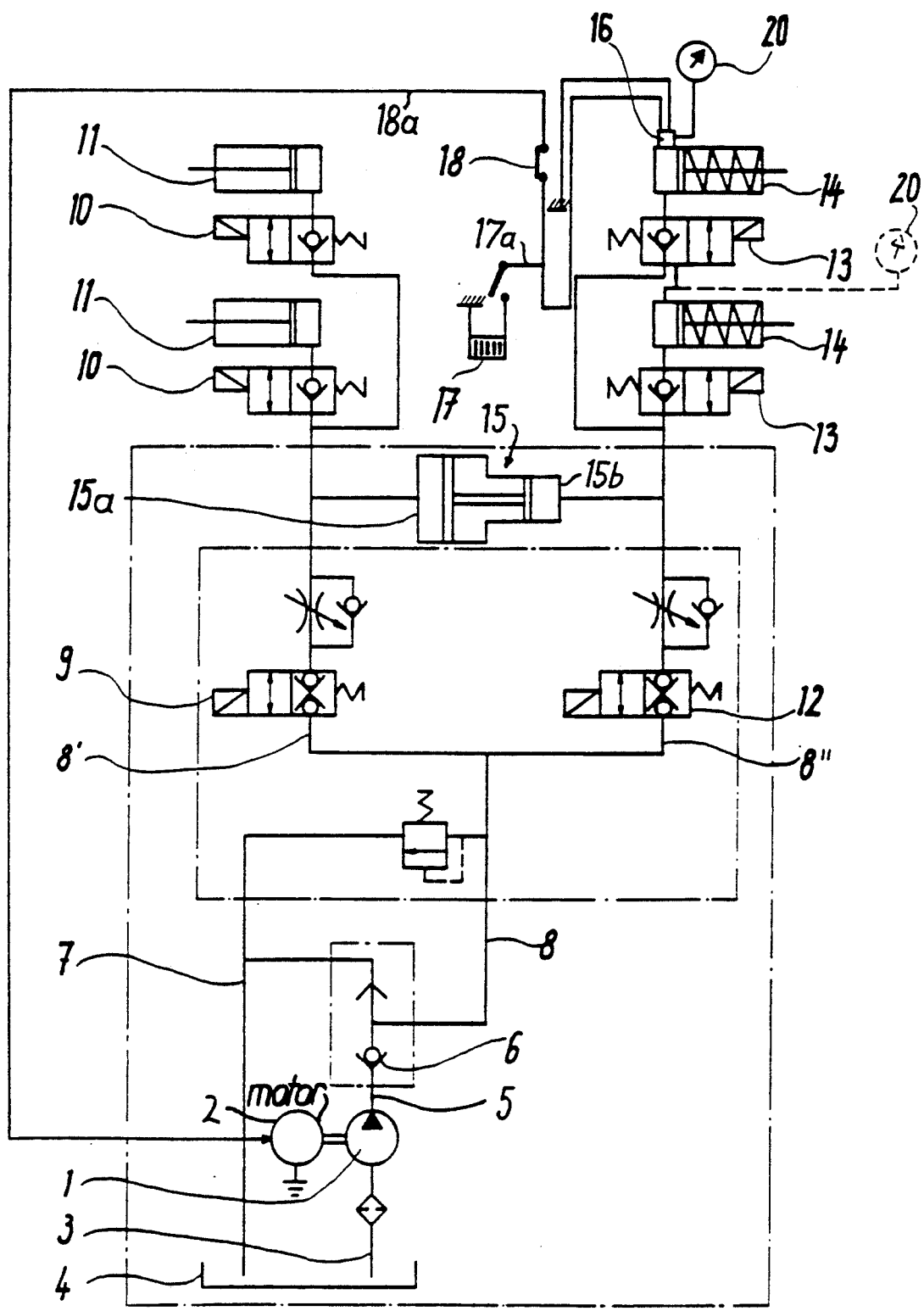

According to FIG. 1, a hydraulic medium pump 1 is driven by an electric motor 2 and is connected to a hydraulic system via a line 3 to a hydraulic medium reservoir 4. The pump 1 is further connected via a pump line 5 containing a non-return valve 6 to a medium return line 7 and a pressure line 8 which branches into branch lines 8', 8''. The branch 8' on the left in FIG. 1 supplies two lifting cylinders 11 of the loading tailgate (not shown) via a controllable lift valve 9 and two controllable lifting cylinder valves 10.

In an analogous manner, the branch line 8'' on the right in FIG. 1 supplies two closing cylinders 14 of the loading tailgate via a controllable closing valve 12 and two controllable closing cylinder valves 13. A pressure intensifier piston cylinder unit 15 is connected in parallel to the branch lines 8', 8'' between the valves 9 and 10 on the one hand, and the valves 12 and 13 on the other hand, the larger head end or chamber 15a of said piston cylinder unit 15 being directed towards the lifting cylinders 11 and the smaller end or chamber 15b to the closing cylinders 14.

The typical operation of such a combination loading and lifting platform and closing wall, forming the tailgate, is this:

Let it be assumed that hydraulic pressure is present, namely that motor 2 operates pump 1. The cylinders 11 control down-up, that is, dropping and lifting movement of the combination tailgate or platform and closing wall. The cylinders 14 control rotation of this combination loading and lifting platform and closing wall between horizontal and vertical orientation, pivoting about an axis close to the vehicle. When the platform is in essentially horizontal position, a load can be placed thereon and the load lifted. When the load then is even with the vehicle loading bay, the platform is rotated so that it will be in a vertical position, thus forming a closing wall for the vehicle. In addition, rotation about that axis of the platform is possible to permit the platform to tip somewhat downwardly at the end removed from the rotation axis, that is downwardly from a horizontal position, to permit rolling a load on the platform. The platform can then be rotated again into a horizontal position for lifting. This lifting movement is controlled by the lifting cylinder 11. All rotary movements, that is from a horizontal to a slightly downwardly tipped position for loading, and later from the horizontal to a vertical position to form a closing wall, is controlled by the closing cylinders 14. These operations are well known and standard in this field.

Let it be assumed that a load is placed on the platform, while the platform is tilted downwardly for loading, and it is then attempted to tilt the platform back into a horizontal position so that, subsequently, it can be raised. The present invention addresses itself to the problem of determining possible overloads and the frequency and intensity of overloads.

In accordance with a feature of the invention, an adjustable electric manometric or pressure-responsive switch 16 is connected to one of the two closing cylinders 14. The switch element is connected by line 17a to a counter 17 and an interrupter switch 18 for connection via line 18a to the electric pump motor 2. The manometric switch 16 is set, e.g. at 220 bar, when the left side 15b of the pressure intensifier is set at 180 bar.

According to a feature of the invention, a manometer or pressure gauge 20 which may be integrated into a housing together with the counter 17 is also connected to the manometric switch 16. The manometer or the housing is arranged in a sealed manner in the control installation of the loading tailgate. The counter 17 indexes to the next position when the predetermined pressure is reached or upon an otherwise occurring overload in order to record the number of possible cases where the load is exceeded over a relatively long period of time. The pressure gauge or manometer 20 is provided with a maximum indicator which is not accessible from the outside and which, in the case of further loading of the loading tailgate once the maximum permissible load has been exceeded and after stoppage of the pump motor, indicates the highest pressure occurring in the closing cylinder upon this inadmissible overload.

Figure 2:
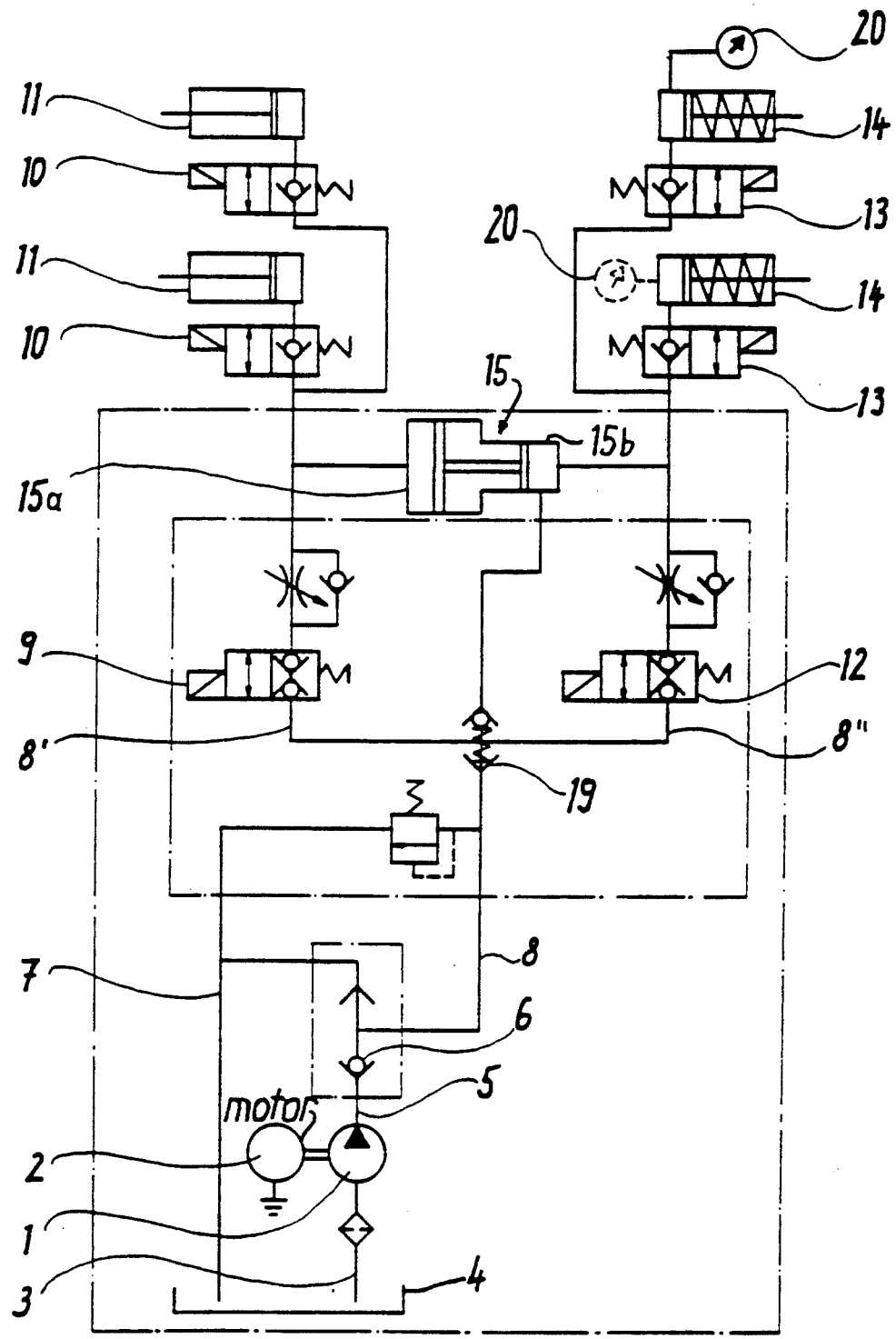

According to the embodiment shown in FIG. 2, the manometric or pressure-responsive switch 16 according to FIG. 1 is replaced by an adjustable hydraulic alternating switch-over valve or shut-off valve 19 connected to the smaller chamber 15 of the pressure intensifier piston cylinder unit 15. The hydraulic valve 19 is inserted into a branching point or junction of the pump branch lines 8', 8", and blocks line 8" when a predetermined pressure, e.g. of 220 bar, is exceeded. The electric pump motor supply line can also the interrupted via this hydraulic valve by a suitable electrical connection. A piston slide valve or the like could also be provided instead of the switch-over hydraulic valve 19 shown. A counter analogous to the counter 17 can also be activated via the hydraulic valve.

As in the embodiment according to FIG. 1, a manometer or pressure gauge 20 having the function already described is connected to one of the closing cylinders 14.

Gauge 20 may be connected to either cylinder 14, if, as is customary, two cylinders for both sides of the tailgate are used, or two manometers or gauges can be used, as shown in FIGS. 1 and 2.

The invention is not limited to the examples shown and these can be modified in many different ways within the scope of the general inventive concept. In particular, therefore, in the embodiment shown in FIG. 2, a hydraulic change-over or switch-over or a shut-off valve 19 can be provided which connects the pump line 8 to the fluid medium return line 7 in the event of overload, so that the pump operates at no load.

I claim:

1. A control device for a hydraulic operating circuit of a combination loading, lifting, and closing wall or tailgate combination of a vehicle, having a hydraulic fluid pump (1) communicating with a fluid supply (4) of pressure fluid;

a motor (2) driving said pump;

a hydraulic system including a pump pressure line (5, 8) connected to said pump, a pump return line (7) connected to the pump and the fluid supply (4);

a first branch line (8') connected to said pump pressure line (8);

a lifting cylinder (11) coupled to said first branch line (8') for lifting said tailgate;

a first control valve (9) controlling admission and drainage of pressurized fluid to said lifting cylinder (11);

a second branch line (8") hydraulically connected to said pump pressure line (8);

a closing cylinder (14) coupled to said second branch line (8") for lifting and closing the combination tailgate;

a second control valve (12) for controlling admission and drainage of pressurized fluid to said closing cylinder (14);

a hydraulic pressure intensifier piston-cylinder unit (15) hydraulically connected across said first and second branch lines, and having a larger piston-cylinder chamber (15a) and a smaller piston-cylinder chamber (15b) hydraulically connected across said branch lines (8', 8'); and comprising, in accordance with the invention, means for determining an overload placed on the combination tailgate upon application of hydraulic pressure to the second branch line (8") for moving the tailgate by said closing cylinder (14), said means including a pressure-responsive electrical switch (16) hydraulically coupled to the closing cylinder (14), said pressure-responsive switch being electrically connected (18a) to and controlling energization of said motor (2) for interruption of hydraulic pressure from said fluid pump (1) to said hydraulic system when the pressure switch (16) senses occurrence of a pressure beyond a predetermined limit in said closing cylinder (14); and a maximum pressure indicating pressure gauge or maximum indicating manometer (20), hydraulically coupled to the closing cylinder (14) and indicating the maximum level of pressure exceeding said predetermined limit upon stoppage of the pump motor; and wherein said maximum pressure indicating pressure gauge (20) is inaccessible from the outside of the vehicle.

2. The device of claim 1, wherein the maximum pressure gauge (20) is hydraulically coupled to said pressure-responsive switch (16) and thus hydraulically coupled to said closing cylinder (14).

3. The device of claim 1, further including a counter (17) coupled to said pressure-responsive electrical switch (16) and counting the number of times of occurrence of said pressure beyond said predetermined limit.

4. The device of claim 1, wherein said maximum indicating pressure gauge or maximum indicating manometer (20) indicates the level of overload after stoppage of the pump motor (2).

5. A control device for a hydraulic operating circuit of a combination loading, lifting, and closing wall or tailgate combination of a vehicle, having
- a hydraulic fluid pump (1) communicating with a fluid supply (4) of pressure fluid;
- a motor (2) driving said pump;
- a hydraulic system including a pump pressure line (5, 8) connected to said pump, a pump return line (7) connected to the pump and the fluid supply (4);
- a first branch line (8') connected to said pump pressure line (8);
- a lifting cylinder (11) coupled to said first branch line (8') for lifting said tailgate;
- a first control valve (9) controlling admission and drainage of pressurized fluid to said lifting cylinder (11);
- a second branch line (8") hydraulically connected to said pump pressure line (8);
- a closing cylinder (14) coupled to said second branch line (8") for lifting and closing the combination tailgate;
- a second control valve (12) for controlling admission and drainage of pressurized fluid to said closing cylinder (14);
- a hydraulic pressure intensifier piston-cylinder unit (15) hydraulically connected across said first and second branch lines, and having a larger piston-cylinder chamber (15a) and a smaller piston-cylinder chamber (15b) hydraulically connected across said branch lines (8', 8"); and comprising, in accordance with the invention,
- means (19) for determining an overload placed on the combination tailgate upon application of hydraulic pressure to the second branch line (8") for moving the tailgate by said closing cylinder (14), said means including
- an adjustable hydraulic pressure-sensing valve (19) hydraulically connected to the smaller piston-cylinder chamber (15b) of said pressure intensifier unit (15), and responding upon sensing of a pressure beyond a predetermined limit in said chamber,
- said adjustable hydraulic pressure-sensing valve (19) further being hydraulically connected to, selectively upon response thereof,
- block hydraulic communication between said first and second branch lines (8', 8"),
- establish hydraulic communication between the pump pressure line (8) and the pump return line (7) to the pressure fluid reservoir (4),
- both block said hydraulic connection between said first and second branch lines (8', 8") and establish said hydraulic communication between the pump pressure line (8) and the pump return line (7); and
- a maximum pressure indicating pressure gauge or maximum indicating manometer (20) hydraulically coupled to said closing cylinder (14) and indicating the maximum level of pressure exceeding said predetermined limit; and
- wherein said maximum pressure gauge or maximum indicating manometer (20) is inaccessible from the outside of said vehicle.

6. The device of claim 5, wherein said maximum pressure gauge or maximum indicating manometer (20) is responsive to operation of said adjustable hydraulic pressure sensing valve (19) upon responding to a pressure beyond said predetermined limit.

7. The device of claim 5, wherein said maximum indicating pressure gauge or maximum indicating manometer (20) indicates the level of pressure exceeding said predetermined limit after response of said adjustable hydraulic pressure sensing valve (19) to a pressure level beyond said predetermined limit.

* * * * *